(12) United States Patent
Koo

(10) Patent No.: US 11,008,980 B1
(45) Date of Patent: May 18, 2021

(54) METHOD OF DIAGNOSING ENGINE PURGE SYSTEM

(71) Applicants: HYUNDAI MOTOR COMPANY, Seoul (KR); KIA MOTORS CORPORATION, Seoul (KR)

(72) Inventor: Bon Chang Koo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/838,213

(22) Filed: Apr. 2, 2020

(30) Foreign Application Priority Data

Nov. 20, 2019 (KR) .................. 10-2019-0149186

(51) Int. Cl.
*F02M 25/08* (2006.01)
*F02D 41/00* (2006.01)

(52) U.S. Cl.
CPC ..... *F02M 25/0827* (2013.01); *F02D 41/0045* (2013.01); *F02M 25/089* (2013.01); *F02M 25/0836* (2013.01)

(58) Field of Classification Search
CPC ............. F02M 25/0836; F02M 25/089; F02M 25/0827; F02M 25/0809; F02D 41/0045; F02D 41/0032; F02D 41/003; F02D 41/22
USPC .......................................... 123/516, 518–521
See application file for complete search history.

(56) References Cited

U.S. PATENT DOCUMENTS

| | | | | |
|---|---|---|---|---|
| 5,005,550 A * | 4/1991 | Bugin, Jr. | ............ | F02M 25/089 |
| | | | | 123/520 |
| 9,109,550 B2 * | 8/2015 | Kempf | ................. | F02M 25/089 |
| 9,528,473 B2 * | 12/2016 | Dudar | ................... | F02B 37/164 |
| 9,957,924 B2 * | 5/2018 | Dudar | ................ | F02M 25/0809 |
| 10,196,992 B2 * | 2/2019 | Imaizumi | ........... | F02M 25/0809 |
| 10,815,937 B2 * | 10/2020 | Dudar | ..................... | F02B 33/34 |
| 10,859,012 B2 * | 12/2020 | Koo | .................... | F02D 41/0042 |
| 2015/0292421 A1 | 10/2015 | Pursifull et al. | | |

FOREIGN PATENT DOCUMENTS

JP       H08-135524 A      5/1996

* cited by examiner

*Primary Examiner* — Gonzalo Laguarda
(74) *Attorney, Agent, or Firm* — Brinks Gilson & Lione

(57) ABSTRACT

A method of diagnosing an engine purge system includes: obtaining, by a controller, a first measurement value by measuring a pressure of a secondary purge line when a boosting pressure from a compressor is greater than or equal to a predetermined reference pressure; obtaining, by the controller, a second measurement value by measuring a pressure of the secondary purge line while opening and closing a purge control solenoid valve when a throttle valve is deployed; determining, by the controller, whether at least one of the secondary purge line or a recirculation line is blocked by comparing the first measurement value and the second measurement value; and providing, by the controller, an alert when it is determined that at least one of the secondary purge line or the recirculation line is blocked.

8 Claims, 3 Drawing Sheets

METHOD OF DIAGNOSING ENGINE PURGE SYSTEM

CROSS REFERENCE TO RELATED APPLICATION

This application claims priority to and the benefit of Korean Patent Application No. 10-2019-0149186, filed on Nov. 20, 2019, the entire contents of which are incorporated herein by reference.

FIELD

The present disclosure relates to a technique for diagnosing an evaporation gas purging system of an engine.

BACKGROUND

The statements in this section merely provide background information related to the present disclosure and may not constitute prior art.

It is regulated by the provision of the law that evaporation gas generated from a fuel tank of a vehicle is prevented from being leaked into the atmosphere. In order to comply with the provision of the law, a method of collecting the evaporation gas is used. In particular, the evaporation gas generated from the fuel tank of the vehicle is collected in a canister according to the method and then the evaporation gas is supplied through an intake system of the engine to a combustion chamber for combustion, when an appropriate condition is formed during the operation of the engine.

The evaporation gas is supplied to the engine combustion chamber naturally by using a negative pressure depending on the operating condition of the engine, without using a separate active actuator.

Therefore, in the vehicle, it is desired to form an appropriate negative pressure for allowing the evaporation gas to flow into the engine combustion chamber as described above, and it is also desired to accurately diagnose whether such a function is normally operated at all times.

The contents described as the related art have been provided only to assist in understanding the background of the present disclosure and should not be considered as corresponding to the related art known to those having ordinary skill in the art.

SUMMARY

The present disclosure provides a method of diagnosing an engine purge system capable of accurately diagnosing whether parts of an engine used to form a negative pressure for purging evaporation gas from a canister into an engine combustion chamber are in a normal state with a relatively simple apparatus and method, thereby securing reliability in smoothly performing an evaporation gas purging function of a vehicle at all times.

According to one form of the present disclosure, there is provided a method of diagnosing an engine purge system, where the engine purge system includes a recirculation line connecting downstream of a throttle valve to upstream of a compressor, a primary purge line connecting a purge control solenoid valve to the downstream of the throttle valve, and a secondary purge line connecting the purge control solenoid valve and the recirculation line through an ejector. The method includes: obtaining, by a controller, a first measurement value by measuring a pressure of the secondary purge line when a boosting pressure from the compressor is greater than or equal to a predetermined reference pressure; obtaining, by the controller, a second measurement value by measuring a pressure of the secondary purge line while opening and closing the purge control solenoid valve when the throttle valve is deployed; determining, by the controller, whether or not at least one of the secondary purge line or the recirculation line is blocked by comparing the first measurement value and the second measurement value; and providing, by the controller, an alert when at least one of the secondary purge line or the recirculation line is blocked.

The predetermined reference pressure may be set to be a level at which the ejector supplies an effective negative pressure to the secondary purge line, during obtaining the second measurement value.

The predetermined reference pressure may be set to be a level at which the ejector supplies an effective negative pressure to the secondary purge line, where the effective negative pressure is caused by air flow flowing from downstream of the throttle valve through the recirculation line when the throttle valve is deployed.

The second measurement value may be set to be a maximum value of pressures measured while opening and closing the purge control solenoid valve.

In one form, when a difference between the first measurement value and the second measurement value is smaller than or equal to a predetermined first difference value, the controller may determine that the secondary purge line is blocked.

In another form, when the difference between the first measurement value and the second measurement value is greater than the first difference value and is smaller than or equal to a predetermined second difference value that is greater than the first difference value, the controller may determine that the recirculation line is blocked.

In other form, as a magnitude of a difference between the first measurement value and the second measurement value decreases, the controller may sequentially determine the blocking of the recirculation line and the blocking of the secondary purge line.

In one form, obtaining the first measurement value and the second measurement value may be performed when the boosting pressure and at least one of an engine coolant temperature, an atmospheric pressure, or a fuel level of a fuel tank satisfy predetermined conditions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
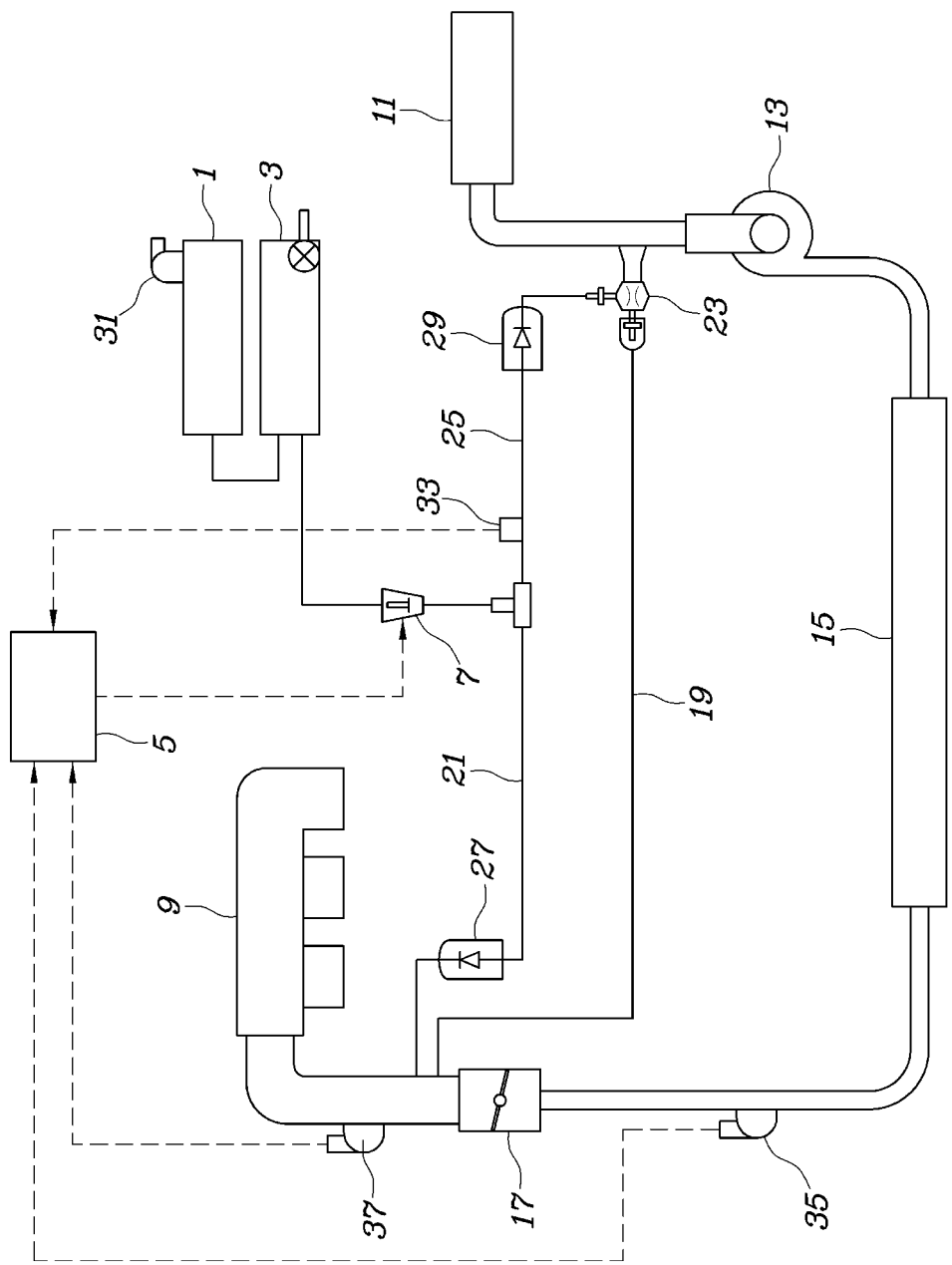
FIG. 1 is a view illustrating an engine purge system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates an engine purge system to which the present disclosure may be applied, the engine purge system being configured such that evaporation gas evaporated from a fuel tank 1 is collected in a canister 3, and the evaporation gas is supplied through a surge tank 9 to an engine combustion chamber for combustion when a controller 5 opens a purge control solenoid valve (PCSV) 7.

Air sucked into an air cleaner 11 is pressurized by a compressor 13 of a turbocharger, cooled in an intercooler 15, and then supplied to the surge tank 9 through a throttle valve 17.

The engine purge system includes a recirculation line 19 connecting downstream of the throttle valve 17 to upstream of the compressor 13, a primary purge line 21 connecting the purge control solenoid valve 7 to the downstream of the throttle valve 17, and a secondary purge line 25 connecting the purge control solenoid valve 7 to the recirculation line 19 through an ejector 23. The primary purge line 21 and the secondary purge line 25 include a first check valve and a second check valve 29, respectively, to prevent the evaporation gas from flowing back to the purge control solenoid valve 7.

As a result, in a state in which a sufficient negative pressure is formed downstream of the throttle valve 17, when the purge control solenoid valve 7 is opened, the evaporation gas having passed through the purge control solenoid valve 7 enters the surge tank 9 through the first check valve 27 of the primary purge line 21 and is transferred to the combustion chamber. In a state in which an effective negative pressure is supplied to the secondary purge line 25 by the ejector 23 based on air flow in the recirculation line 19, when the purge control solenoid valve 7 is opened, the evaporation gas having passed through the purge control solenoid valve 7 is transferred through the second check valve 29 of the secondary purge line 25 to the surge tank 9 via the compressor 13.

The ejector 23 has a venturi tube structure, and thus, functions to inhale the evaporation gas from the secondary purge line 25, resulting from a pressure drop formed by the air flow from downstream of the throttle valve 17 through the recirculation line 19 to upstream of the compressor 13.

In addition, the engine purge system includes a first pressure sensor 31 measuring a pressure inside the fuel tank 1, a second pressure sensor 33 measuring a pressure of the secondary purge line 25, a third pressure sensor 35 measuring a boosting pressure supplied from the compressor 13 to the throttle valve 17, and a fourth pressure sensor 37 measuring a pressure of the surge tank 9 and an intake manifold, and the controller 5 is configured to receive signals from these sensors.

Figure 2:
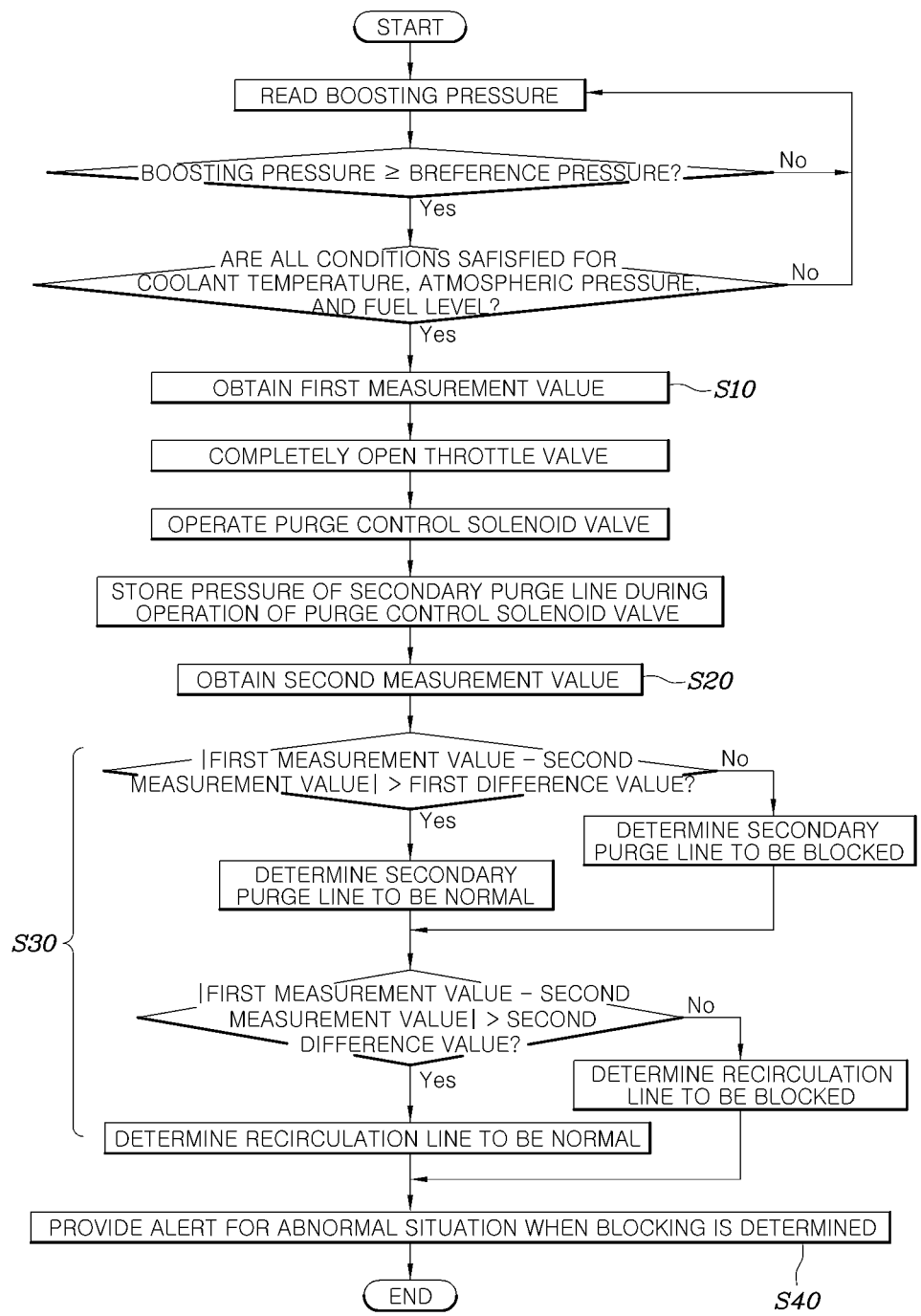
FIG. 2 is a flowchart illustrating one form of a method of diagnosing an engine purge system.

Referring to FIG. 2, a method of diagnosing an engine purge system according to one form of the present disclosure includes: obtaining, by the controller 5, a first measurement value by measuring a pressure of the secondary purge line 25 in a situation in which the boosting pressure from the compressor 13 is greater than or equal to a predetermined reference pressure (S10); obtaining, by the controller 5, a second measurement value by measuring a pressure of the secondary purge line 25 while opening and closing the purge control solenoid valve 7 in a state in which the throttle valve 17 is deployed (S20); determining, by the controller 5, whether or not at least one of the secondary purge line 25 or the recirculation line 19 is blocked by comparing the first measurement value and the second measurement value (S30); and providing, by the controller 5, an alert if it is determined that at least one of the secondary purge line 25 or the recirculation line 19 is blocked (S40).

That is, the controller 5 is configured to obtain measurement values measured by the second pressure sensor 33 for the pressure of the secondary purge line 25 under the two conditions, determine that the secondary purge line 25 and the recirculation line 19 are blocked by comparing the measurement values, and provide an alert of the blocking, so that a user may take an appropriate action such as maintenance.

The reference pressure is set to be a level at which the ejector 23 may supply the effective negative pressure to the secondary purge line 25 when the obtaining of the second measurement value is performed.

That is, the reference pressure is set to be a level at which the ejector 23 may supply the effective negative pressure to the secondary purge line 25 caused by the air flow flowing from downstream of the throttle valve 17 through the recirculation line 19, in the state in which the throttle valve 17 is deployed.

Here, the ejector 23 may supply the effective negative pressure to the secondary purge line 25 by forming a pressure drop at such a level as to inhale the evaporation gas from the secondary purge line 25, based on the venturi effect caused when the air passes through the ejector 23 via the recirculation line 19 as described above.

That is, in a state in which the boosting pressure formed by the compressor 13 is greater than or equal to the reference pressure, if the throttle valve 17 is fully opened, the flow of the air recirculated from downstream of the throttle valve 17 through the recirculation line 19 to upstream of the compressor 13 enables the ejector 23 to suck the evaporation gas from the secondary purge line 25 when the purge control solenoid valve 7 is opened.

Of course, the evaporation gas sucked by the ejector 23 is transferred to the combustion chamber for combustion through the compressor 13 together with other air.

The second measurement value may be set to be a maximum value of pressures measured while opening and closing the purge control solenoid valve 7 multiple times for a predetermined time.

Figure 3:
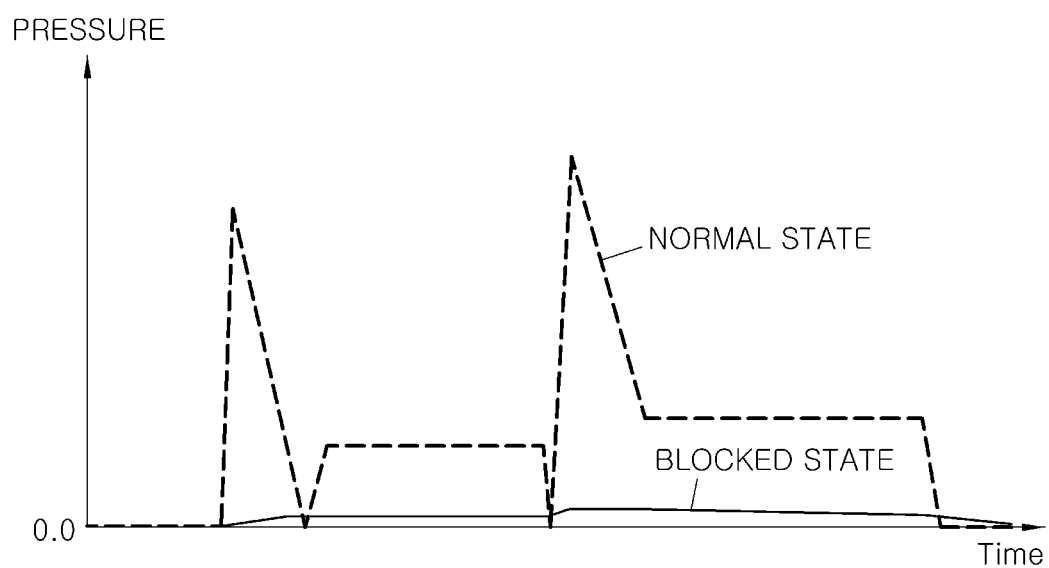
FIG. 3 are graphs illustrating a change in pressure of a secondary purge line when a purge control solenoid valve is opened and closed according to one form of the diagnosis method of the present disclosure.
Figure 3:
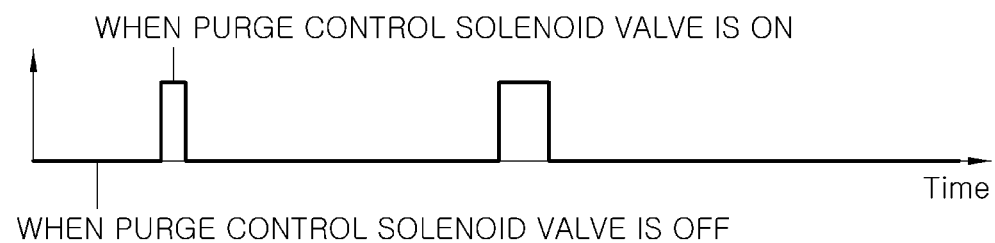

That is, referring to FIG. 3, whenever the purge control solenoid valve 7 is turned on and opened, the pressure of the secondary purge line 25 increases, and the second measurement value is set to be the maximum value during the change in pressure.

The controller 5 determines that the secondary purge line 25 is blocked, if a difference between the first measurement value and the second measurement value is smaller than or equal to a predetermined first difference value.

Also, the controller 5 determines that the recirculation line 19 is blocked, if the difference between the first measurement value and the second measurement value is greater than the first difference value and is smaller than or equal to a predetermined second difference value that is greater than the first difference value.

That is, as a magnitude of the difference between the first measurement value and the second measurement value decreases, the controller 5 sequentially determines the blocking of the recirculation line 19 and the blocking of the secondary purge line 25.

For example, when the first difference value is set as 50 hPa and the second difference value is set as 100 hPa, the controller 5 determines that the secondary purge line 25 is blocked if the difference between the first measurement value and the second measurement value is smaller than or equal to the first difference value, i.e. 50 hPa, determines that the recirculation line 19 is blocked if the difference between the first measurement value and the second measurement value is greater than the first difference value but is smaller than or equal to the second difference value, i.e. 100 hPa, and determines that both the secondary purge line 25 and the recirculation line 19 are not blocked and are in a normal state if the difference between the first measurement value and the second measurement value is greater than the second difference value.

When the secondary purge line 25 is blocked, even if the purge control solenoid valve 7 is opened, the secondary purge line 25 almost has no change in pressure depending on whether the purge control solenoid valve 7 is opened or closed as described in FIG. 3. Thus, the first difference value is set to be a relatively small value as described above. When the secondary purge line 25 is not blocked but the recirculation line 19 is blocked, the ejector 23 does not provide an effective negative pressure. Although the pressure of the secondary purge line 25 is changed to some extent depending on whether the purge control solenoid valve 7 is opened or closed, the change in pressure is smaller when compared to that when the ejector 23 operates normally. Thus, this has been considered in setting the second difference value.

Accordingly, the controller 5 is capable of diagnosing whether the secondary purge line 25 and the recirculation line 19 are blocked by merely obtaining the first measurement value and the second measurement value from the second pressure sensor 33 of the secondary purge line 25 and comparing the first measurement value and the second measurement value, thereby enabling the user of the vehicle to look for an appropriate action in advance.

In one form, the obtaining of the first measurement value and the obtaining of the second measurement value are performed when at least one condition is satisfied for an engine coolant temperature, an atmospheric pressure and a fuel level of the fuel tank 1, in addition to the boosting pressure.

That is, in order to promote a more accurate diagnosis, the diagnosis method according to the present disclosure as described above may be performed when all of the following conditions are satisfied together: it is checked whether the engine coolant temperature is in an appropriate range so that the diagnosis according to the present disclosure can be made with the engine being in a normal operating state, not in a cold startup state or in an overheated state; an atmospheric pressure range is checked so as to verify whether the vehicle is at a normal position, not at a high-altitude position; and it is determined whether the fuel level of the fuel tank 1 is not too high or low so that an appropriate diagnosis can be made for the evaporation gas.

According to the present disclosure, it is possible to accurately diagnose whether the parts of the engine used to form a negative pressure for purging the evaporation gas from the canister into the engine combustion chamber are in a normal state with a relatively simple apparatus and method, thereby securing reliability in smoothly performing the evaporation gas purging function of the vehicle at all times.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A method of diagnosing an engine purge system, where the engine purge system includes a recirculation line connecting downstream of a throttle valve and upstream of a compressor, a primary purge line connecting a purge control solenoid valve and the downstream of the throttle valve, and a secondary purge line connecting the purge control solenoid valve and the recirculation line through an ejector, the method comprising:
    obtaining, by a controller, a first measurement value by measuring a pressure of the secondary purge line when a boosting pressure from the compressor is greater than or equal to a predetermined reference pressure;
    obtaining, by the controller, a second measurement value by measuring a pressure of the secondary purge line while opening and closing the purge control solenoid valve when the throttle valve is deployed;
    determining, by the controller, whether at least one of the secondary purge line or the recirculation line is blocked by comparing the first measurement value and the second measurement value; and
    providing, by the controller, an alert when at least one of the secondary purge line or the recirculation line is blocked.

2. The method of claim 1, wherein the predetermined reference pressure is set to be a level at which the ejector supplies an effective negative pressure to the secondary purge line, during obtaining the second measurement value.

3. The method of claim 1, wherein the predetermined reference pressure is set to be a level at which the ejector supplies an effective negative pressure to the secondary purge line, the effective negative pressure caused by an air flow flowing from downstream of the throttle valve through the recirculation line when the throttle valve is deployed.

4. The method of claim 1, wherein the second measurement value is set to be a maximum value of pressures measured while opening and closing the purge control solenoid valve.

5. The method of claim 1, wherein when a difference between the first measurement value and the second measurement value is smaller than or equal to a predetermined first difference value, the controller is configured to determine that the secondary purge line is blocked.

6. The method of claim 5, wherein when the difference between the first measurement value and the second measurement value is greater than the predetermined first difference value and is smaller than or equal to a predetermined second difference value, the controller is configured to determine that the recirculation line is blocked, and
    wherein the predetermined second difference value is greater than the predetermined first difference value.

7. The method of claim 1, wherein as a magnitude of a difference between the first measurement value and the second measurement value decreases, the controller is configured to sequentially determine the blocking of the recirculation line and the blocking of the secondary purge line.

8. The method of claim 1, wherein obtaining the first measurement value and the second measurement value is performed when the boosting pressure and at least one of an engine coolant temperature, an atmospheric pressure, or a fuel level of a fuel tank satisfy predetermined conditions.

* * * * *